(12) United States Patent  
Oliver et al.

(10) Patent No.: US 8,375,450 B1
(45) Date of Patent: Feb. 12, 2013

(54) ZERO DAY MALWARE SCANNER

(75) Inventors: Jonathan James Oliver, Victoria (AU);
Cheng-Lin Hou, Cupertino, CA (US);
Lili Diao, Nanjing (CN); YiFun Liang,
Milpitas, CA (US); Jennifer Rihn,
Mountain View, CA (US)

(73) Assignee: Trend Micro, Inc., Tokyo (JP)

( * ) Notice: Subject to any disclaimer, the term of this patent is extended or adjusted under 35 U.S.C. 154(b) by 596 days.

(21) Appl. No.: 12/573,300

(22) Filed: Oct. 5, 2009

(51) Int. Cl.
*G06F 21/00* (2006.01)

(52) U.S. Cl. .............. 726/24; 726/22; 726/23; 713/181; 713/187; 713/188

(58) Field of Classification Search .............. 726/22–24; 713/181, 187–188
See application file for complete search history.

(56) References Cited

U.S. PATENT DOCUMENTS

| 2007/0136455 | A1* | 6/2007 | Lee et al. | 709/223 |
| 2007/0240219 | A1* | 10/2007 | Tuvell et al. | 726/24 |
| 2010/0115620 | A1* | 5/2010 | Alme | 726/24 |

* cited by examiner

*Primary Examiner* — David Garcia Cervetti
*Assistant Examiner* — Ghazal Shehni
(74) *Attorney, Agent, or Firm* — Beyer Law Group LLP

(57) ABSTRACT

A training model for malware detection is developed using common substrings extracted from known malware samples. The probability of each substring occurring within a malware family is determined and a decision tree is constructed using the substrings. An enterprise server receives indications from client machines that a particular file is suspected of being malware. The suspect file is retrieved and the decision tree is walked using the suspect file. A leaf node is reached that identifies a particular common substring, a byte offset within the suspect file at which it is likely that the common substring begins, and a probability distribution that the common substring appears in a number of malware families. A hash value of the common substring is compared (exact or approximate) against the corresponding substring in the suspect file. If positive, a result is returned to the enterprise server indicating the probability that the suspect file is a member of a particular malware family.

32 Claims, 11 Drawing Sheets

Leaf Node Information

| | Malware MD5 | Method | SigID | Offset | Length | Family |
|---|---|---|---|---|---|---|
| 532 | 0837695f1e26577ee0d6 | DTREE | 15 | 0 | 3350 | PE_TANK.A |
| | 0fa40c1c8f947dc2c0ea | DTREE | 15 | 0 | 3350 | PE_TANK.A |
| | 8ef488800a15dd7497fc | DTREE | 14 | 2421 | 1563 | PE_TANK.A |

| | Malware MD5 | Method | SigID | Offset | Length | Family |
|---|---|---|---|---|---|---|
| 534 | 87194fae01bbcebb7def | DTREE | 18 | 155 | 21 | Possible_Pai-2 |
| | 3e3f84d46848f1756e714 | No_Family_Identified | | | | |
| | eb84fabd81bb5674e1a8 | DTREE | 18 | 880 | 21 | Possible_Pai-2 |

| | Malware MD5 | Method | SigID | Offset | Length | Family |
|---|---|---|---|---|---|---|
| 536 | 06c5fb34f6cdd2688c3c | SEARCH | 10 | 2348 | 1342 | PAK_Generic.005 |
| | be470d2515aa9dbc793d | SEARCH | 9 | 5 | 22 | PAK_Generic.001 |
| | 60287ac6745f256f21a9 | SEARCH | 13 | 214 | 1077 | PAK_Generic.006 |

Output of Results

*FIG. 7*

ZERO DAY MALWARE SCANNER

FIELD OF THE INVENTION

The present invention relates generally to malware detection. More specifically, the present invention relates to identifying unknown malware using common substrings from known malware families.

BACKGROUND OF THE INVENTION

Traditional malware scanning methods depend on knowing malware signatures beforehand. After collecting all known malware samples, a backend system generates a malware pattern using the known instance-based malware signatures and distributes the pattern to customers. This is called the "virus dictionary approach." This approach is considered to be reliable and only causes a marginal number of false positives. Because of its accuracy in detecting malware, this approach is extensively used by the industry. The open source virus scanner "ClamAV" is one example.

The use of a virus dictionary, however, has some disadvantages. Such a scanner will not identify unknown malware. This disadvantage causes systems protected by this approach to be exposed to new threats between the time the malware is released to the field and the backend system delivers a new pattern to the customer site. Another disadvantage occurs when new variants of existing malware are released. If the virus dictionary uses techniques such as an SHA-1 hash, then the new variants will not be in the virus dictionary. Also, the number of malware programs has grown dramatically in the past couple years. The hash-based malware patterns bloat the size of the dictionary accordingly. Identifying malware using large malware dictionaries can consume too much memory and use a lot of CPU cycles.

Due to the inadequacy of current techniques in detecting unknown malware and preventing zero-day attacks, some systems are based on behavior monitoring. In the paper titled Learning and Classification of Malware Behavior, the tool CWSandbox is used for extracting features and an SVM is used for performing learning and classification. But, the use of run-time behavior monitoring has a number of disadvantages: it requires more computational power from the defending machines which in turn drags down the performance of all other programs on the same platform; and some malware does not exhibit its malware behavior if it can determine that it is being monitored (for example, while it is in a sandbox).

The following issues also need to be addressed: it may be necessary to identify previously unknown malware variants in an organization; an organization may not want to report malware to anti-virus companies due to privacy; and it is important to minimize the computational burden on the client machines within an organization, both in terms of memory usage, and in terms of CPU cycles. Regarding privacy, the organization may not want to divulge the raw file to the virus researcher, which makes virus detection and signature generation difficult.

Thus, it is desirable to speed up virus scanning and to reduce the memory footprint without relying on instance-based malware patterns or behavior monitoring.

SUMMARY OF THE INVENTION

To achieve the foregoing, and in accordance with the purpose of the present invention, a technique for identifying unknown malware is disclosed that is based on global monitoring and common substring identification. The technique uses runtime activities and apriori knowledge of common substrings with probability distribution from malware families to predict if an unknown file is malware.

To detect unknown malware as outlined above, a method utilizes collaborative intelligence and common substrings extracted from known malware families. Global observations reveal many machines becoming infected in real time; examining the presence of common substrings helps identify the likelihood of the file being malware. Further, a virus mutation may also be detected.

The memory usage issue is addressed by using common substrings, which significantly reduces the amount of the memory needed for storing patterns. The performance issue is addressed by using decision-tree fast matching, which can reach a conclusion in no more than the number of the steps equal to the height of the tree. For example, even though hundreds or thousands of common substrings may be identified that indicate malware, it is a monumental task to determine if any one of these substrings starts at the many thousands of potential offsets within a suspect malware file. A linear search algorithm may be used (an exhaustive search), but this is extremely time consuming and resource intensive. Advantageously, use of the decision tree provides a very quick result indicating which substring is likely to start at a particular offset within the suspect file. It is then a straightforward matter to use a location-sensitive hash, for example, to determine if that substring is actually present in the suspect file.

The computational burden may also be placed on machines separate from those doing productive work for the organization, for example, by using a central enterprise server. The privacy issue is addressed by the coverage generalized by common substrings which can predict unknown malware without examining the raw files. Further, the technique can still tip off IT administrators to suspicious activities without examining the original raw files.

In addition, for each common substring of a malware sample we are able determine the probability of it belonging to each known malware family. If an administrator is willing to submit suspicious files to the backend anti-virus company, this probability distribution helps malware researchers analyze suspicious samples faster. In other words, the invention is capable of predicting the likelihood that the malware belongs to a particular malware family, which greatly aids the virus researcher.

BRIEF DESCRIPTION OF THE DRAWINGS

The invention, together with further advantages thereof, may best be understood by reference to the following description taken in conjunction with the accompanying drawings in which:

FIG. 7 illustrates a table that may be used to output results from the analysis.

DETAILED DESCRIPTION OF THE INVENTION

Figure 1:
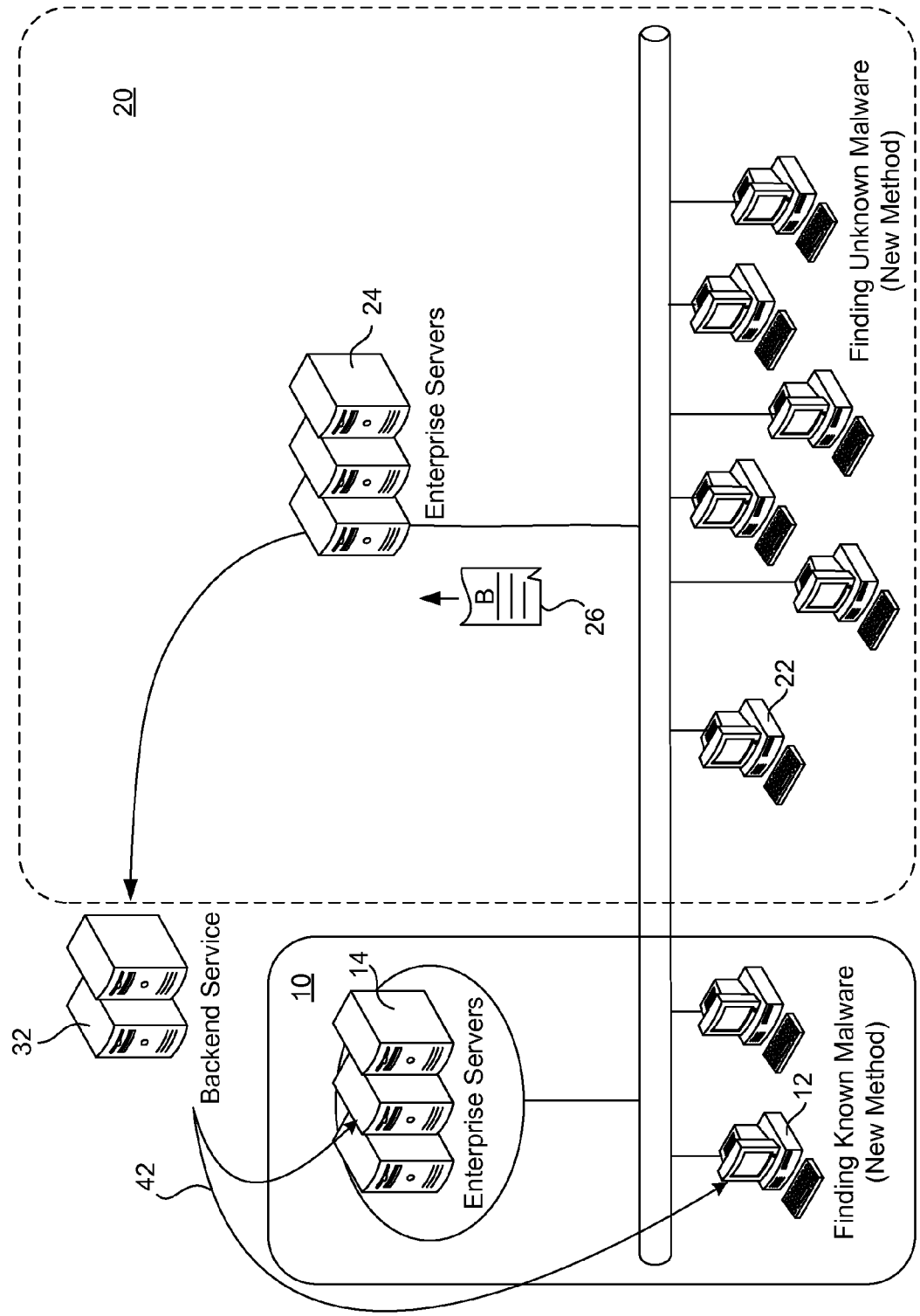
FIG. 1 illustrates examples of both prior art and the new approach to malware direction.

FIG. 1 illustrates examples of both prior art 10 and the new approach 20 to malware detection. Under the prior art current method, a file A is detected on a client computer 12 within an enterprise and the client computer determines that this file is on the blacklist. Accordingly, the CRC of this file is sent from the client computer to an enterprise server 14. The enterprise server then sends the scanning results back to the client computer. In this example, it is necessary for a signature for file A to be known and to be on a blacklist at the client computer.

In order to monitor the statistics of each given file, the present invention utilizes a central server 24 for monitoring and collecting client machine activity within some organization 20. The central server 24 also performs malware scanning. On the client side, a filtering mechanism is used to prevent sending out unnecessary information to the central server. For example, a white list and a black list is maintained on each client machine and helps the client 22 filter out known legitimate software and known malware.

When a client computer 22 detects a file B 26 that is suspect, it first checks this file against a white list and a blacklist. One way to encode the raw file B is by using hash functions. We use functions such as CRC, MD5 or SHA-1 to compute the hash value of a given file. This hash value is then checked against the white list and the black list of hash values. If the hash value is found on either list, the client can take actions autonomously. For a white list hit, the action is "pass." On the other hand, for a black list hit, the action is "quarantine" or "delete."

If the hash value is not found on either the white or black list, the client sends the hash value to the central server 24. (Alternatively, the client may send the CRC of the file.) On the central server, we monitor for hash values which are sent from multiple client machines. For those hash values which are sent above a threshold number from a variety of client machines an alert is generated. The central server then collects the associated file B from one of the client machines and analyzes it using the "Sample Prediction" method described below.

For example, the enterprise server may use a machine learning filter to determine the probabilities that file B is a member of each known malware family. Next, the enterprise server may determine that file B is highly suspicious and alerts the IT staff of the enterprise. At this point the staff may: add the file to the black list; add the file to the white list; or send the raw file to a virus researcher at a backend service 32, such as a researcher at Trend Labs (typically outside the enterprise). If the enterprise is willing to send the raw file to the backend service, a virus researcher can perform further analysis and put the file definitively on either a white list or a black list so next time the file need not be processed again. Accordingly, the backend service 32 receives file B either from the enterprise or from a sample exchange network. Using available knowledge (such as sandboxes, machine learning filters, further verifications, etc.) a malware analyst may determine that file B is in fact malware. The backend service then adds the new instance into a malware family and uses a suffix tree (for example) to extract updated family signatures. These signatures are then distributed 42 to a variety of enterprises and client computers for future malware detection.

Enterprise Monitoring

Figure 2A:
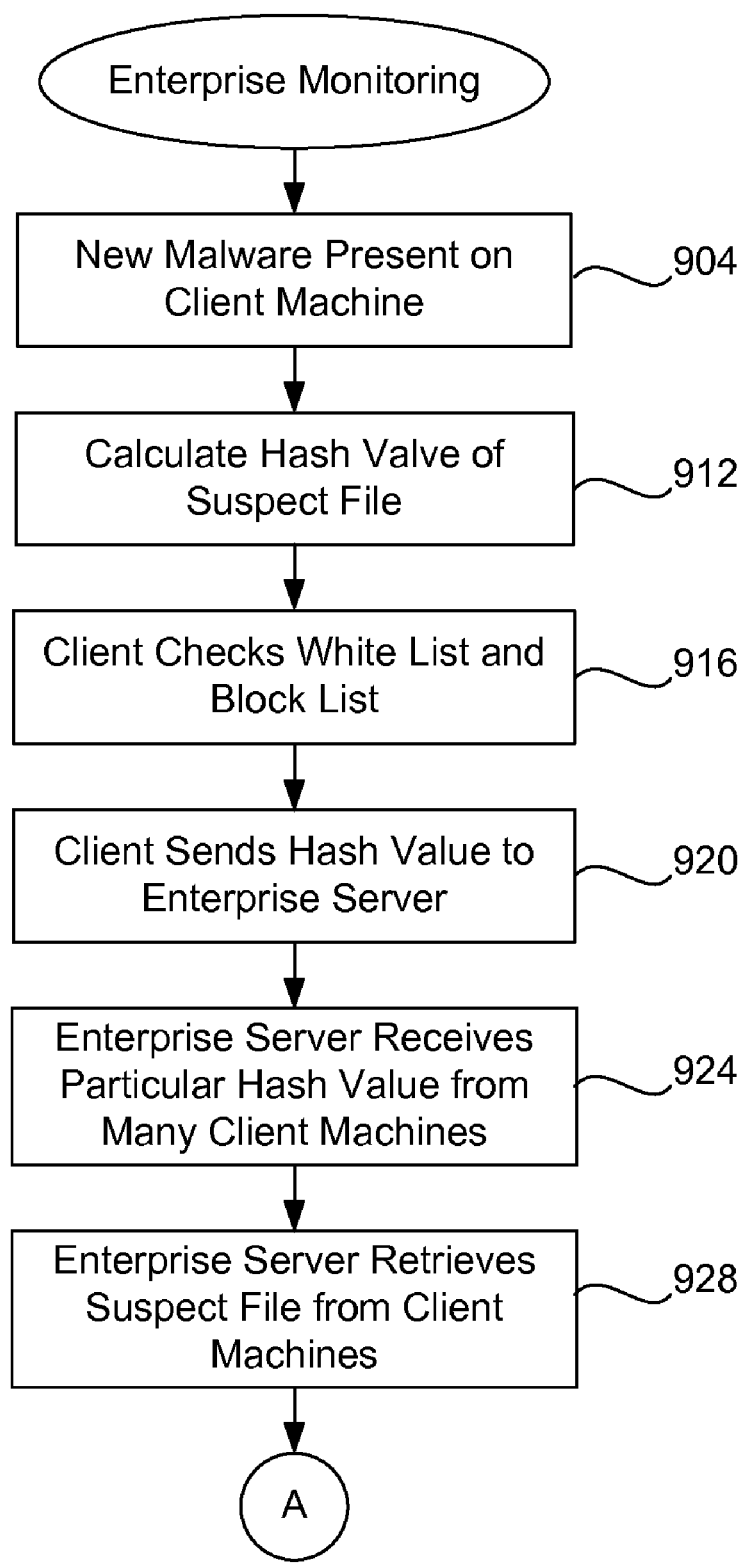
FIGS. 2A and 2B illustrate a flow diagram for detecting malware within an enterprise according to one embodiment of the present invention
Figure 2B:
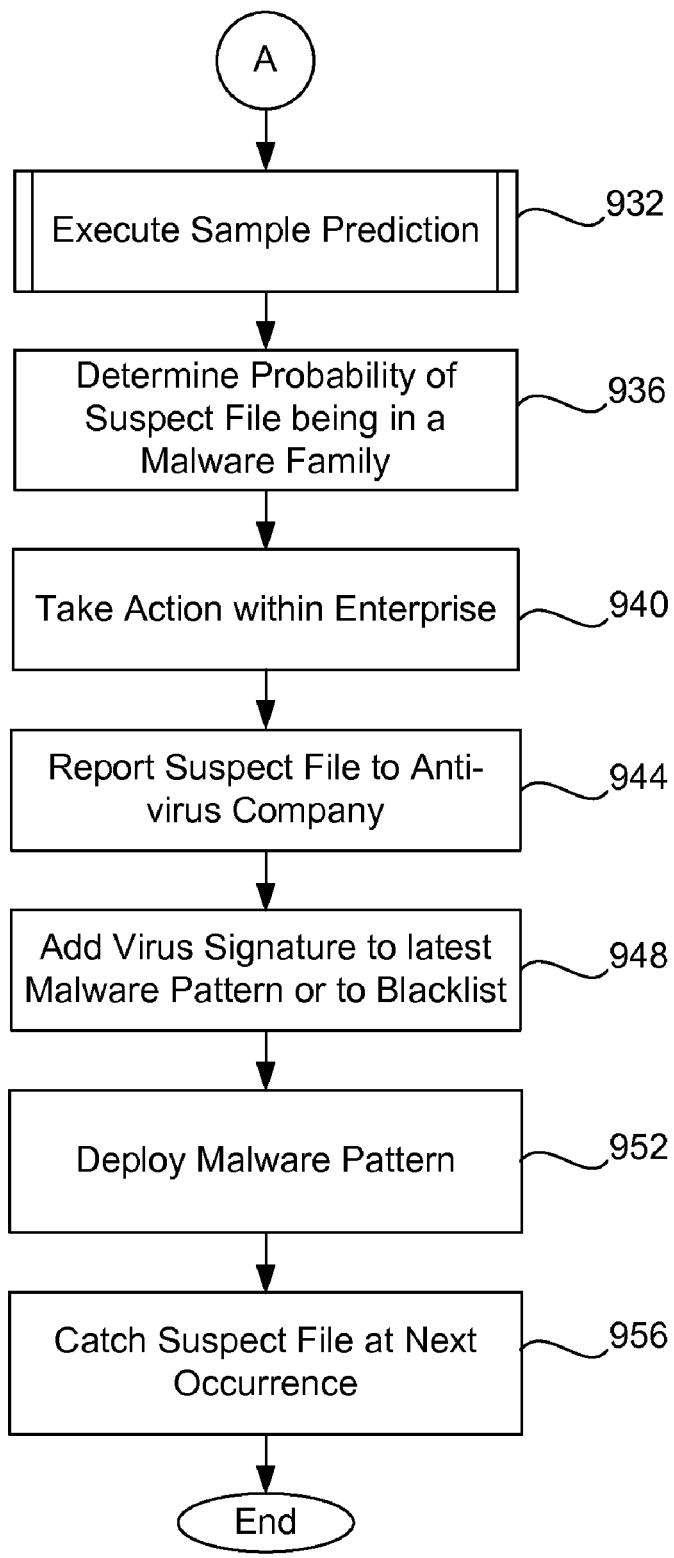

FIGS. 2A and 2B illustrates a flow diagram for detecting malware within an enterprise according to one embodiment of the present invention. In step 904 new malware is present on a client machine within an enterprise. The malware may arrive over the Internet, via an e-mail message, via an inserted flash drive, etc.

In one embodiment, any new file appearing on the client machine is considered suspect. In step 912 the client computer calculates a hash value of the suspect file using any suitable hash function. In step 916 the client then checks this value against a known white list and black list to determine if the suspect file is known to be legitimate or is known to be malware. Determining a hash value and checking it against a list may be done in different ways (for example, using a CRC or MD5). One efficient technique is to use a Bloom filter to perform these checks of the white list and blacklist.

Assuming that the suspect file is truly an unknown file (and appears neither on the white list nor black list), in step 920 the client computer sends the calculated hash value to a central enterprise server 24. The enterprise server is continuously receiving suspect hash values from any number of client machines within the organization. If the suspect file is actually malware, but is unknown, then it is likely that the enterprise server will be unable to detect that the file is malware based upon the hash value or CRC. Most likely the malware will then begin to replicate itself on numerous client machines within the enterprise. At some point, the enterprise server receives a threshold number of the same hash value from different infected client machines and makes a determination that an alert should be generated or that possibly there is a virus outbreak. Accordingly, in step 928 the central enterprise server then retrieves the actual suspect file from any one of the client machines from which it has received one of the same hash values. The central server is arranged to be able to access and retrieve any necessary files from any of the client machines within the organization.

In step 932 the enterprise server takes the suspect file and executes the sample prediction algorithm (as described below) in order to determine if the file is highly suspicious. Accordingly, in step 936 the probability that the suspect file belongs to one or more particular malware families is determined. In step 940 the IT administrator may look into the matter and decide to take a particular action within the enterprise. For example, a policy may be invoked dependent upon how suspicious the suspect file appears and its probability of being malware. At this point, no virus researcher has analyzed the suspect file so the file may be considered highly suspicious or not very suspicious. An action to be taken includes deleting the file from client computers, adding the file to a black list, quarantining the client computers, and other traditional antivirus measures.

Assuming that the enterprise policy permits the raw suspect file to be released, in step 944 the suspect file and its probability of being in a particular malware family are released to the backend service 32, such as any suitable antivirus research facility (for example, Trend Labs, Inc.). At the backend service, an antivirus researcher will be able to analyze the suspect file. Accordingly, in step 948 if it is determined that the suspect file is in fact malware, then its malware signature is added to the latest malware pattern for later distribution to enterprise servers at a variety of companies. Alternatively, the virus signature or its CRC is added to a black list for distribution to individual client computers. In one specific embodiment, the black list Bloom filter is updated in the pattern file. Alternatively, if the suspect file is not malware, then the white list Bloom filter is updated.

In step 952 this latest malware pattern or latest blacklist is deployed either to enterprise servers or to individual client machines, respectively. In step 956 the updated client machine or enterprise server is then able to catch the next occurrence of when the suspect file infects a computer within the enterprise (because the virus signature of the suspect file is present at the enterprise server or the suspect file is on the black list at the client machine).

Model Training

Figure 3A:
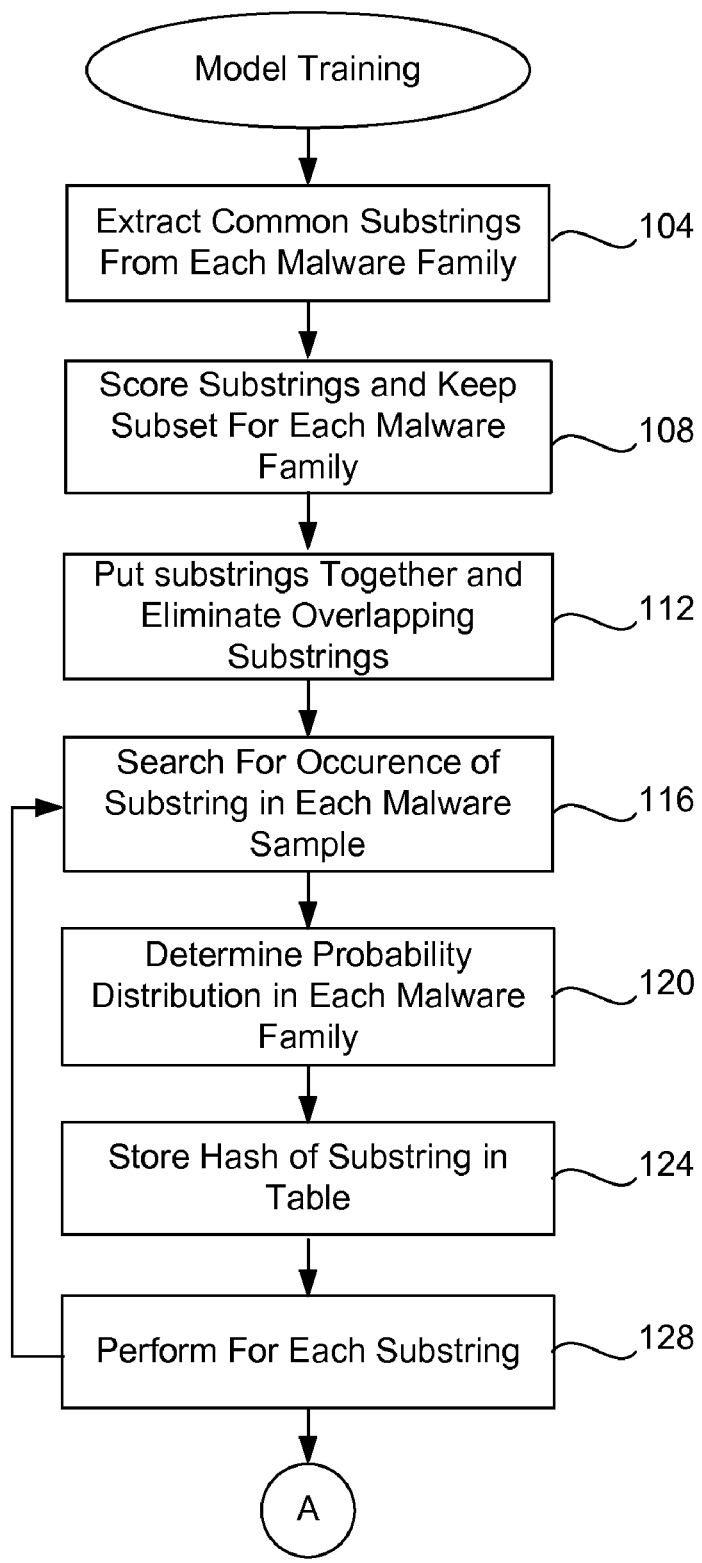
FIGS. 3A and 3B illustrate a flow diagram for performing model training.
Figure 3B:
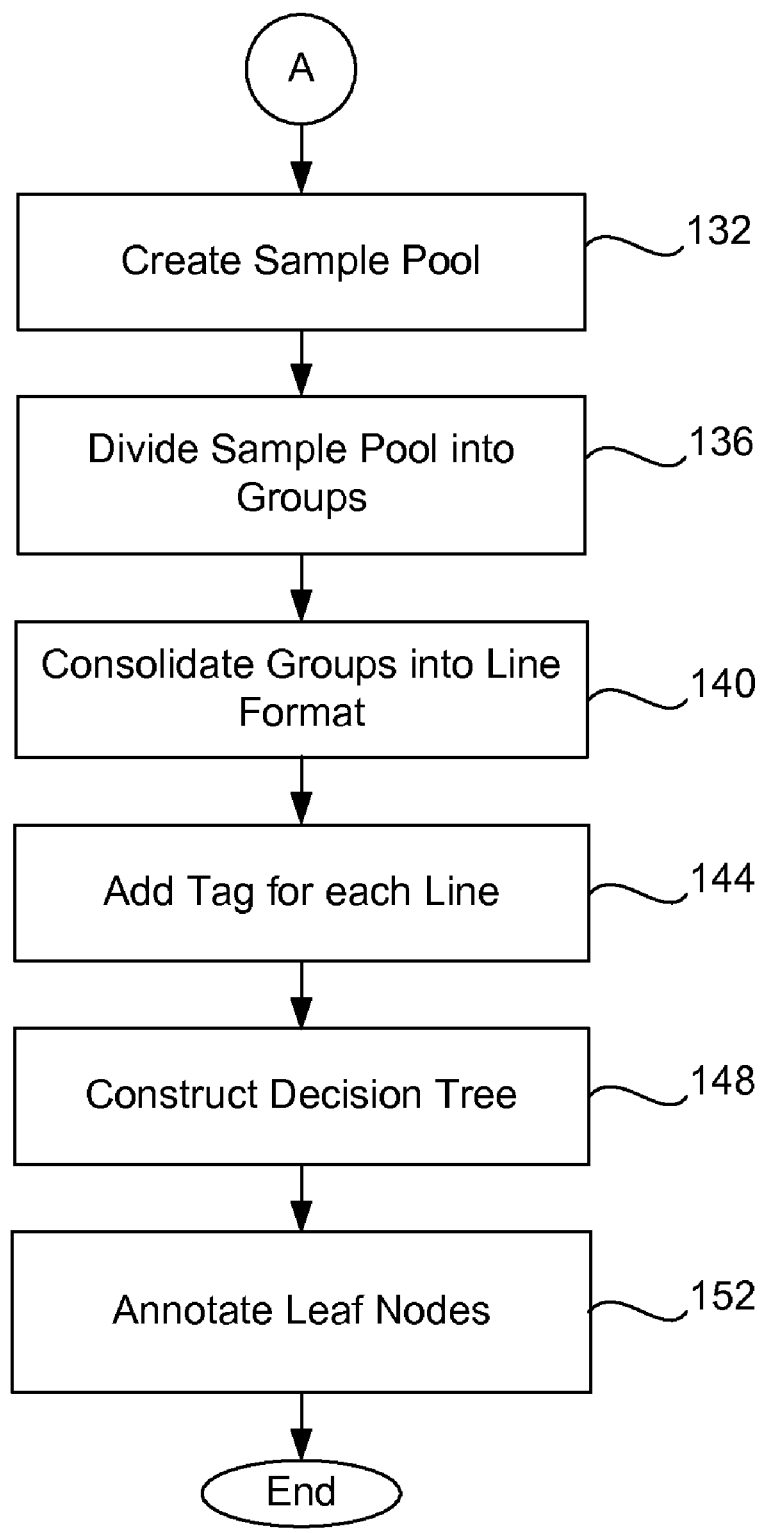

In order for the sample prediction step 932 to operate correctly, the invention first performs model training as described below in FIGS. 3A and 3B. Model training involves extracting common substrings for each malware family in the training pool. These expected substrings are in turn used to scan all malware samples. Based upon the number of hits within each malware family, it is possible to develop a probability distribution and build a decision tree for use in sample prediction.

In step number 104 any number of common substrings are extracted from a set of malware sample files in the training pool. The training pool is any number of samples of known malware, for example, on the order of 5,000 files, and includes any number of families of malware. In one experiment, there were approximately 20-30 malware families in the pool. Preferably, only that portion of each malware file that is actually part of the binary code is used in the analysis of whether common substrings exist. For example, many files include data, resources, tables, etc. that are not the actual binary code that forms the malware. In one specific embodiment, only the first 4 k bytes of binary code from the ".text" section of each malware file are used in the analysis of common substrings. There are a variety of ways in which common substrings may be extracted from the malware files in the training pool. These techniques include dynamic programming or multiple sequence alignment. In one particular embodiment, the well-known suffix tree is used to extract the common substrings. Each common substring will typically be on the order of about 40-1,000 bytes long, and is typically found in most of the files in the training pool. Also, it is possible that a single malware family might be represented by several different common substrings.

In step 108 each extracted common substring is scored according to a particular score function and the best N representative substrings are kept for each malware family. A variety of score functions may be used. In one embodiment, the score function takes into account the length of the substring, the number of occurrences in the samples in the training pool, and other statistics. One example of the score function is $$s = \sqrt{length * \sqrt[3]{files}}$$

Typically, each common substring is scored during the process of extracting it from the training pool. In one embodiment, approximately 1-10 common substrings are kept for each malware family. The result is that N representative substrings for each of M malware families of the training pool are kept. The other common substrings are discarded and not used further.

In step 112 any overlapping substrings are eliminated from the total number of extracted substrings from step 108. For example, if a certain substring is present in more than one malware family, each duplicate version of this substring is subtracted from the M*N representative substrings so that only one version is present in the total. Once a set of representative common substrings has been determined, the probability distribution is then calculated for each common substring.

As indicated in step 128, steps 116, 120 and 124 are performed for each representative substring obtained as a result of step 112. First, in step number 116 we search for the occurrence of the substring in each malware sample in the pool. Once it is determined in which malware samples the substring appears, in step 120 the probability distribution is determined based upon the number of occurrences of the substring in each malware family. For example, consider three malware families in the training pool: PE_TANK, PAK_GENERIC and TROJ_GENERIC. If it is determined that a common substring S shows up in these malware families (in the malware samples in these families) a total of 12 times, then that information is used to calculate the distribution. For example, if the common substring S shows up 5 times in PE_TANK, 3 times in PAK_GENERIC, and 4 times in TROLGENERIC, we record PE_TANK(5/12), PAK_GENERIC(3/12 or 1/4) and TROJ_GENERIC(4/12 or 1/3). The probability distribution of this common substring in each malware family is then recorded in a probability distribution table.

In addition, a CRC and a locality-sensitive hash value is calculated for the common substring in step 124. Any suitable locality-sensitive hash function may be used; for example the Nilsimsa hash function. As is known in the art, while a regular hash function provides radically different values if even a single bit is changed in a string, a locality-sensitive hash function provides graduated degrees of difference in values depending upon how much a string is changed. In other words, a locality-sensitive hash function has a concept of distance between the original string and the string to which it is compared. This hash value is stored along with the probability distribution data for the substring in the table.

As mentioned above, step 128 indicates that the above three steps are performed for each representative substring. Once the last substring has been processed, then a decision tree is constructed for performing fast scanning as described below.

In step 132, each malware sample from the training pool but does contain one of the representative common substrings is added to a sample pool set of files. Although the original training pool may contain a large number of malware samples, it is likely that some of the samples will not include any of the identified representative common substrings and these samples will not be added to the sample pool. In step 136 the sample pool is further divided into sets of small groups by grouping together the representative common substrings that have the same offset within a file. The offset refers to the location relative to the beginning of the data at which the common substring begins. In step 140 each group of malware samples is further consolidated. Within each group, we align the contents extracted from the first 4 k bytes of data in the ".text" section, and then use range representation to consolidate them into a one line formats. For example, if we have two malware instances 0xA 0x1 0xB and 0xA 0x3 0xB that are both identified by the same common substring with the same offset, we consolidate those instances to represent them as 0xA 0x1-0x3 0xB.

In step 144 a tag for each line is added. This tag is the offset and the family name identified above. Next, in step 148 a decision tree is built using the information gathered above. The decision tree may be constructed using techniques from the machine learning field, such as the recursive partitioning algorithm. Step 152 annotates the leaf nodes of the decision tree with information as described below. For example, each leaf node of the decision tree gives the byte offset of the predicted beginning of the substring within the suspect malware file. In addition, the leaf node provides the probability distribution of the substring within malware families. Once the decision tree has been constructed it may be stored in a suitable memory location of a computer, associated with a malware scanning application, output from a computer for a user to view, etc.

Figure 4:
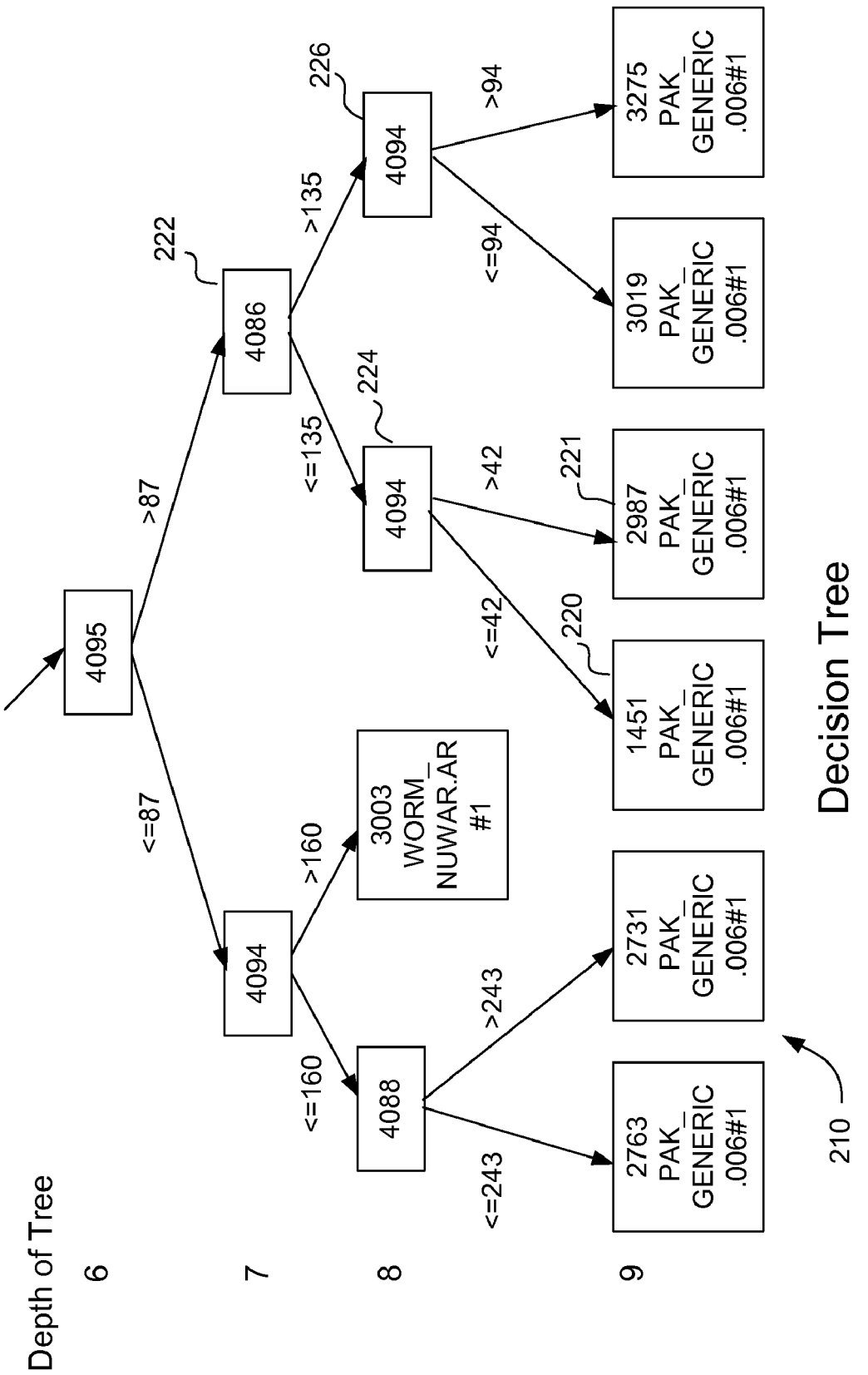
FIG. 4 illustrates one example of a decision tree.

FIG. 4 illustrates one example of a decision tree 210. For simplicity, only a lower portion of the decision tree showing numerous leaf nodes is shown. The number inside each node box is the byte offset inside the data of the suspect file. We examine the value of the byte located at the byte offset. Depending on the result of comparing the value of the byte with the numerical values at the branches below the node, we traverse the tree either following the right branch or the left branch.

For example, a byte value of "42" or greater indicated at node 224 (at byte offset 4094) means traverse to node 221, while a value of less than or equal to "42" means traverse to node 220. For example, leaf node 220 indicates that at a byte offset of 1451 it is likely that the common substring begins within the suspect malware file. The name "PAK_Generic.006 #1" is the name of the possible malware family.

Figure 5:
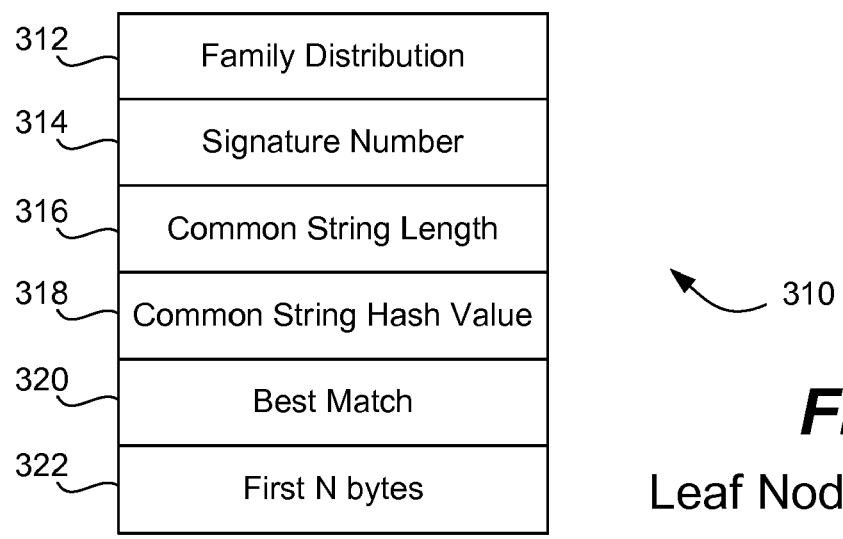
FIG. 5 illustrates information that is annotated onto each leaf node.

FIG. 5 illustrates information 310 that is annotated onto each leaf node. Family distribution 312 indicates the probability distribution of the common substring within a variety of malware families. Signature number 314 indicates an internal index number for quickly locating the corresponding record. Common string length 316 indicates the length in bytes of the common substring represented by this leaf node. Common string hash 318 provides the CRC and the locality sensitive hash value of this common substring. Best match 320 provides the most likely malware family to which the suspect malware file belongs. First bytes 322 provides the first N bytes of the common substring. In one particular example, leaf node 220 provides the following annotated information: Family probability distribution (BKDR_Generic (3), Mal_Banker (5), Mal_HPGN-1 (1), PAK_Generic.006 (50), Possible_Virus (4), TROJ_Generic (3)); Signature number (Pat #0); Common string length (1078); Common string CRC (528551618); Best match (PAK_Generic.006); and First N bytes (0, 131, 56, 97, 8, 116, 0, 73). In one embodiment, it is not necessary to save the entire common substring. For an exact match, the CRC value (for example) is enough.

Thus, this leaf node information indicates that the malware family "PAK_Generic.006" is most likely the family to which the suspect malware file belongs because the common substring which begins at byte offset 1451 occurs 50 times in this malware family. As described below, the sample prediction algorithm uses the decision tree to rapidly identify a common substring and an offset and is then able to determine if the common substring is present in the suspect malware file at that offset. Advantageously, the decision tree provides a substring and offset much more quickly than would a linear search technique (such as the Aho-Corasick algorithm).

Sample Prediction

Figure 6A:
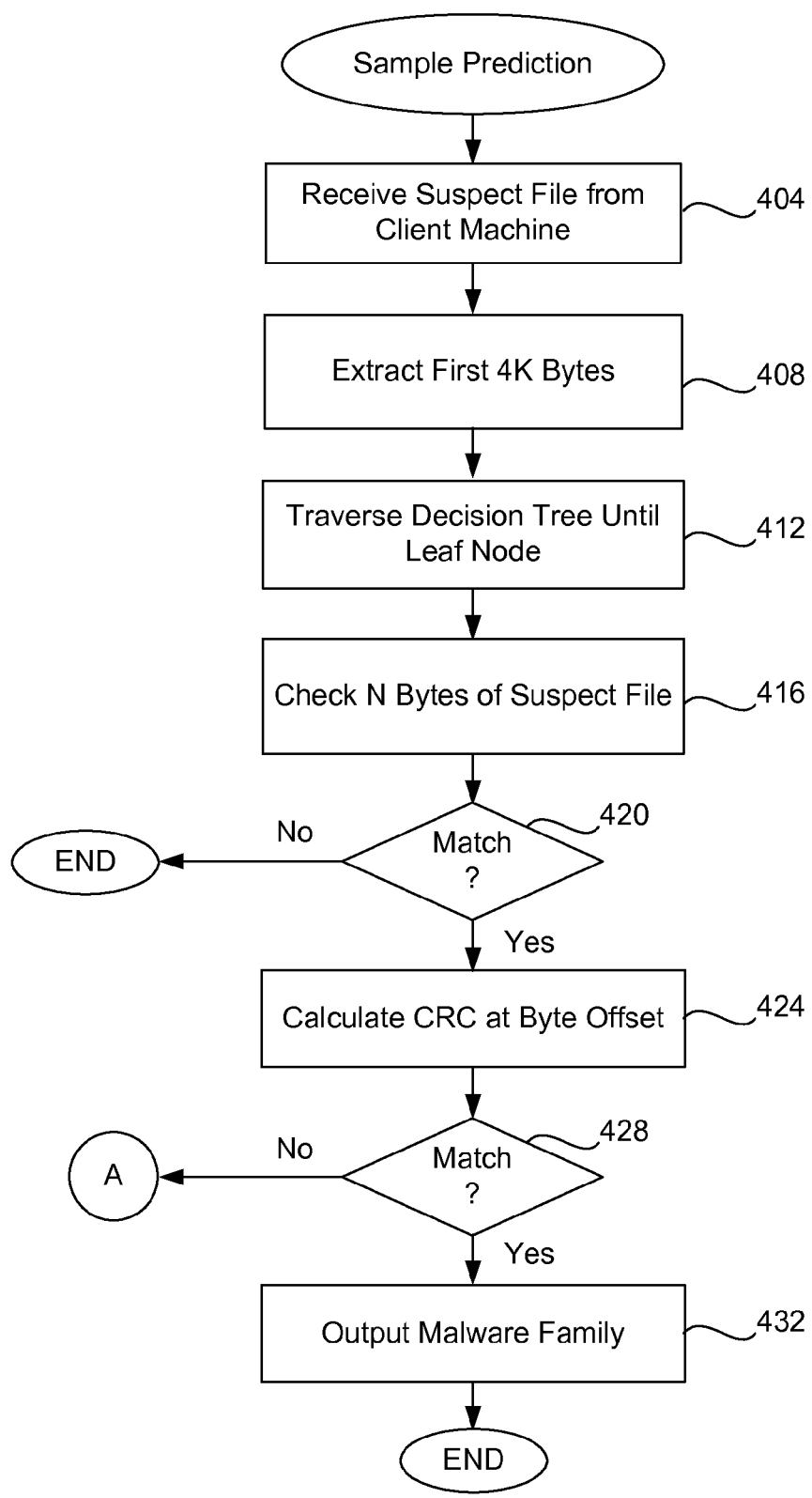
FIGS. 6A and 6B describe sample prediction.
Figure 6B:
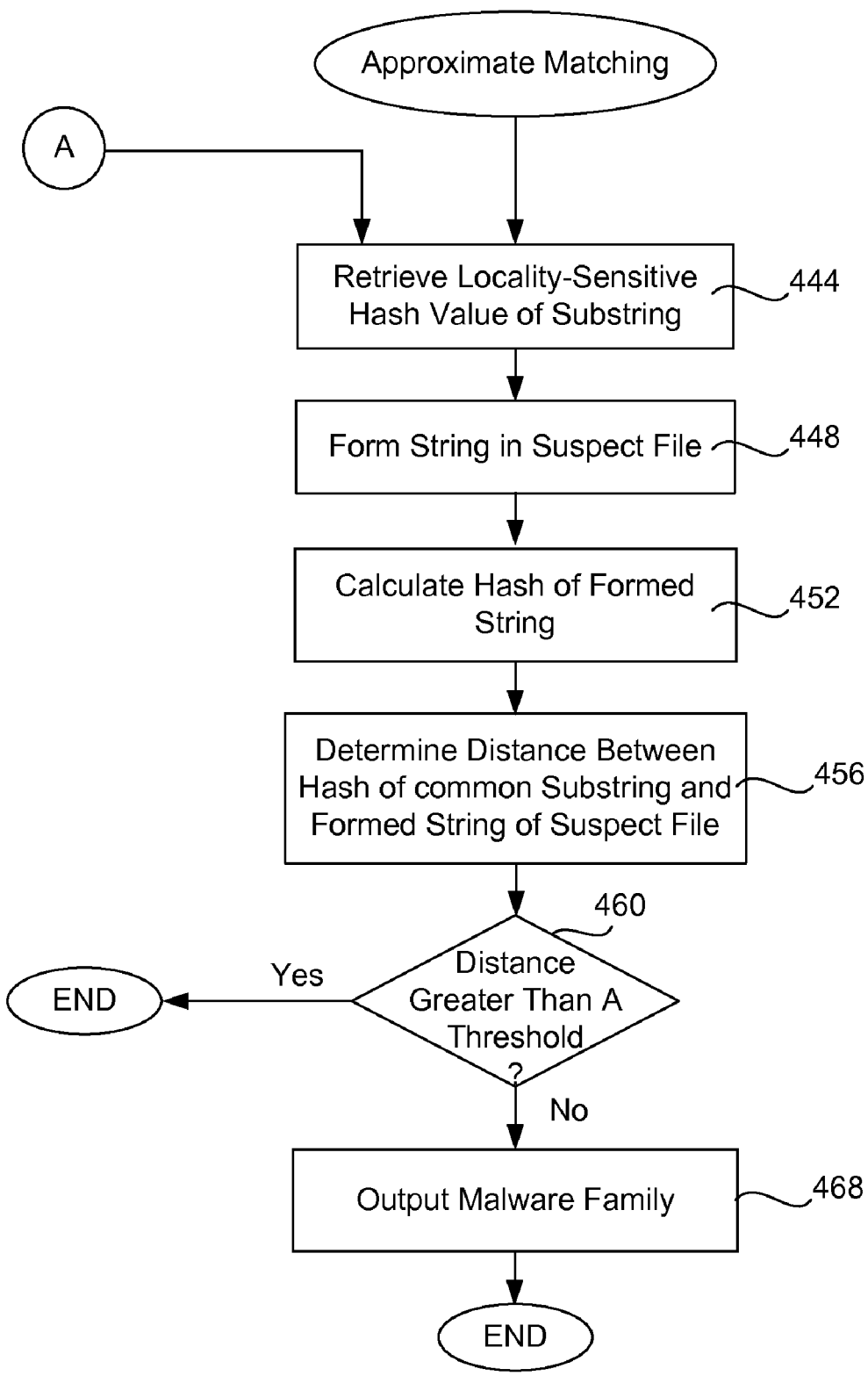

Once the model training has been completed, the system is ready to perform an analysis to determine if a suspect file is malware. The system uses the above decision tree to quickly locate a proper offset within the suspect file and then determines if the sub string begins at that offset. If there is no match, the system may use alternative approaches such as approximate string matching or a comprehensive string search. FIGS. 6A and 6B describe sample prediction.

As described earlier in FIG. 2A, a suspect file has been identified at a client machine and the enterprise server 24 has requested a copy of this suspect file. Accordingly, in step 404 this suspect file is received at the enterprise server from a client machine for analysis to determine if it is malware. In step 408 the first 4 k bytes of binary code from the ".text" section (for example) are extracted from the suspect file for analysis. As mentioned earlier, it can be more efficient to focus initially on only the first 4 k bytes of the .text section of a suspect file; in addition, the common substrings were only extracted from the first 4 k bytes of the .text section of the malware samples.

In step 412 the enterprise server analysis software traverses the previously constructed decision tree (for example, tree 210 formed in FIG. 3B) in order to determine an offset within the suspect file and a common substring to look for. For clarity, only a portion of decision tree 210 is shown in FIG. 4. Of course, the decision tree is much larger as only levels 6-9 (including the leaf nodes) are shown. Traversal begins at the root node of the decision tree at a particular byte within the first 4 k .text section of the suspect file. This byte is not necessarily the first byte of this section. The root node can start with any byte, depending upon what kind of decision tree algorithm is used.

If the value of that particular byte is greater than a certain number then the lower right branch is traversed to the next level, while if the value of that byte is less than or equal to the certain number than the lower left branch is taken to the next level. For example, node 222 indicates a byte at an offset of 4086 from the beginning of the section of the suspect file under analysis. If that byte has a value greater than 135 then the tree is traversed to node 226. But, if that byte has a value of less than or equal to 135 then the tree is traversed to node 224. At node 224 if the byte at an offset of 4094 has a value of less than or equal to 42 and the tree is traversed to leaf node 220. In this fashion the decision tree is traversed from its root node to a leaf node jumping between bytes in the suspect file and comparing values until finally a leaf node is reached. As described above in FIG. 5, each leaf node includes a byte offset for where to begin searching for the common substring in the suspect file (for example, 1451 at leaf node 220), and the name of the most likely malware family (for example, PAK_Generic.006 #1).

The leaf node also includes the malware family probability distribution, the length of the common string that is likely found at this offset within the suspect file, the CRC of the common string, and the first N bytes of the suspect file to analyze.

At step 416 the first N bytes of the suspect file (starting at the offset provided in the leaf node) are compared against the common substring N bytes at 322 identified by the leaf node. This step is useful to speed up the string matching. Typically, the value of N is in the range of 8 to 12; thus, this rapid step can quickly determine whether or not the common substring is present in the suspect file at this offset before a more lengthy analysis is performed below. In step 420 if these first bytes do not match the ones in the common substring then the analysis ends and it cannot be determined if the suspect file is a member of a particular malware family. The result is "no family can be identified."

But, if there is a match in step 420, this indicates that it is likely that the common substring is present at this offset in the suspect file. Accordingly, step 424 calculates the CRC value (or a suitable hash value) of a string in the suspect file that begins at the provided byte offset and extends for the common string length 316. If this calculated CRC value matches the common substring CRC value 318, then it is determined in step 428 that there is a match. Thus, the family probability distribution 312 is consulted for the leaf node and the malware family having the highest probability for that common substring is returned as the likely malware family corresponding to the suspect file. If there is no match in step 428 then control moves to step 440 to perform approximate string matching. Approximate string matching is appropriate at this point since the exact matching of step 428 (which is a fast matching) has not been successful, but it is still possible that the string found at the byte offset in the suspect file is very similar to a common substring. A similar string indicates that it is still likely that the suspect file is a member of a malware family.

Step 440 also begins with the leaf node that has been determined by the above traversal of the decision tree (for example, leaf node 220). In this step a common substring is identified and an offset within the .text section of the suspect file where that common substring might begin. Also determined from the leaf node is the length of the common sub string and the other information as shown in FIG. 5. In step 444 the locality-sensitive hash value for the common substring (previously calculated above in step 124) is retrieved from the probability distribution table where it had been stored. In step 448 the system forms a string in the suspect file starting at the offset provided and extending for the substring length; it is possible this string is similar to the common substring. In step 452 the locality-sensitive hash value of this formed string is calculated (using the same locality-sensitive hash function used to calculate the hash value of the common substring). In step 456 the distance between these two hash values is determined using a technique suitable to the locality sensitive hash function used. For example, some locality-sensitive hash functions use a distance value equivalent to the number of different bits between two hash values. Other techniques may also be used to determine the distance between these two hash values.

If the distance is greater than a particular threshold in step 460 then the process ends and it is determined that no malware family can be identified. But, if the distance is less than a predetermined threshold then it is determined that the suspect file does contain the common substring (or an approximate match thereof) and the malware family probability distribution found in the leaf node is then returned to a user in step 468.

Of course, if there is no exact match or an approximate match, it is always possible to perform a comprehensive string search (a linear search) using an algorithm such as Aho-Corasick. This comprehensive string search would be time-consuming in that all of the common substrings (or a portion thereof) are searched for in the suspect file. Because it is unknown at which offset any one of these substrings might begin, the process is time-consuming.

Output of Results and Possible Actions

Using the example of the decision tree of FIG. 4 where leaf node 220 provides a representative common substring that does match (either fast matching or approximate matching) a portion of the suspect file, then the malware family probability distribution 312 of that leaf node may be returned to a system administrator. In this example, the results returned are: BKDR_Generic (3), Mal_Banker (5), Mal_HPGN-1 (1), PAK_Generic.006 (50), Possible_Virus (4), TROJ_Generic (3)). This probability distribution indicates that out of a total of 66 occurrences of the common substring within the training pool, the substring occurs in PAK_Generic.006 50 times, far greater than in any other malware family.

FIG. 7 illustrates a table 510 that may be used to output results from the analysis. It shows the analysis of nine different files. Included is a column 520 showing the MD5 of the suspect file, a column 522 showing the method used to determine the result (either decision tree or comprehensive search), a column 524 showing the signature identifier of the leaf node (a key used to find related data structures in a program), a column 526 showing the offset within the suspect file where a common substring was identified, a column 528 showing the length of the common substring, and a family 530 listing the most likely malware family to which the suspect file belongs. Row 532 illustrates that for one particular suspect file a decision tree was used to determine that the file is likely a member of the PE_TANK.A malware family. Row 534 indicates that for this particular suspect file no malware family was able to be identified, indicating that it is possible the file is not malware. Row 536 indicates that while the decision tree was not able to identify a likely malware family, a comprehensive search does indicate that the most likely malware family is PAK_Generic.005. An IT administrator or a virus researcher at the backend service may use these results to take any particular action or to perform further analysis on the suspect file.

The IT administrator or the system administrator of the enterprise may take any suitable action upon being notified that the suspect file likely contains one of the representative common substrings and is likely a member of one or more malware families. For example, actions related to the organization may be taken such as: alerting users that a suspicious file has been identified; temporarily adding the hash value of the suspect file to distributed black lists; and quarantining the client machines having the suspect file. The enterprise may also send any suspicious files to the backend service so that the service can perform further analysis and update virus patterns for a future release.

Computer System Embodiment

Figure 8A:
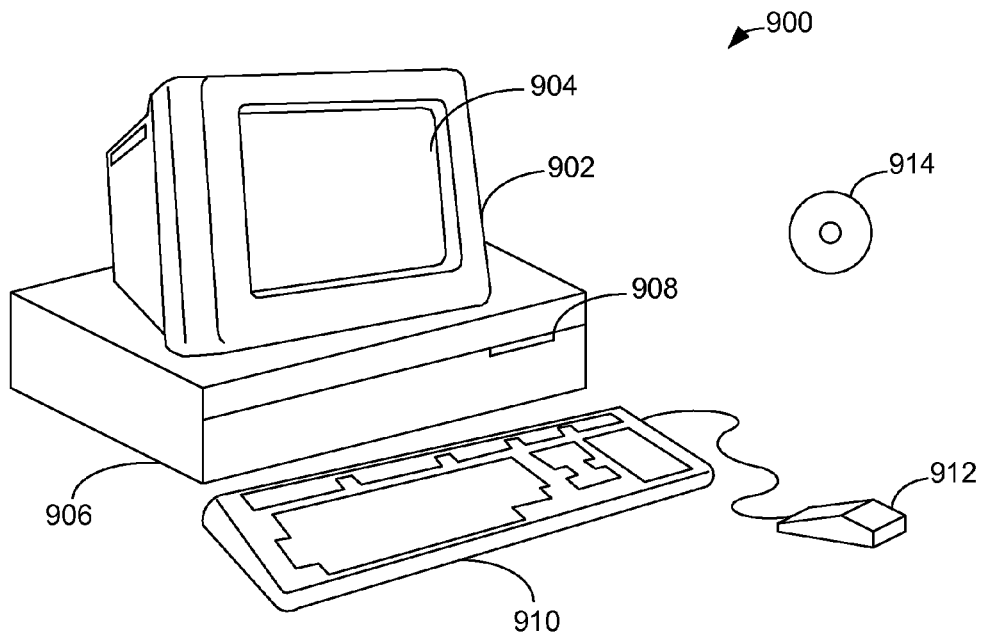
FIGS. 8A and 8B illustrate a computer system suitable for implementing embodiments of the present invention.
Figure 8B:
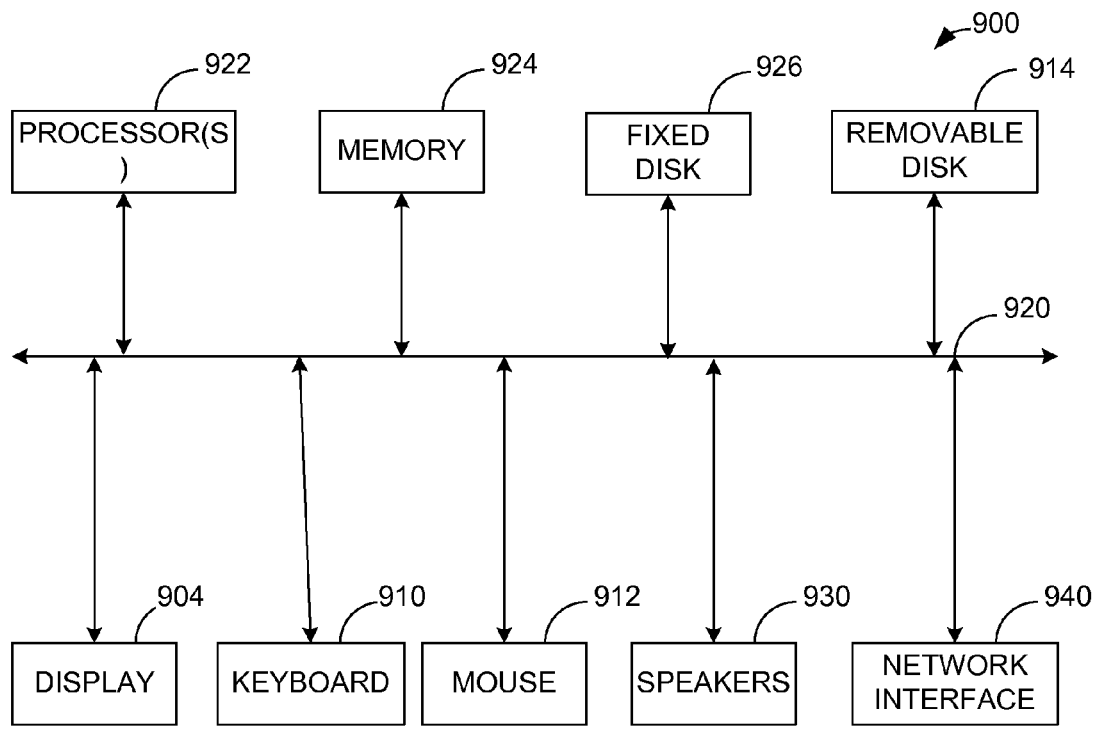

FIGS. 8A and 8B illustrate a computer system 900 suitable for implementing embodiments of the present invention. FIG. 8A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 8B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk)

that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of training a model for use in malware detection, said method comprising:
   identifying, on a computer, a training pool that includes samples of executable software programs that are known to be malware, said malware samples representing a plurality of malware families;
   extracting a plurality of substrings of executable code from said malware samples, each of said extracted substrings being common to at least two of said malware samples;
   determining the probability of each of said common substrings occurring in each of said malware families; and
   constructing, on said computer, a decision tree using those malware samples that include at least one of said common substrings, wherein each node of said decision tree includes a byte offset index into a computer file suspected of being malware, wherein branches of said decision tree identify possible numerical values at said byte offset index, and wherein each leaf node of said decision tree identifies one of said common substrings and identifies a byte offset into said computer file where it is likely that said common substring begins, whereby said decision tree is used to determine if said computer file is malware.

2. A method as recited in claim 1 wherein said each leaf node of said decision tree further identifies said probability of said common substring occurring in at least one of said malware families.

3. A method as recited in claim 1 further comprising:
   scoring each of said extracted substrings; and
   retaining only a limited number of said extracted substrings for each of said malware families based upon said score of each extracted substring.

4. A method as recited in claim 1 further comprising:
   extracting said plurality of substrings using a suffix tree.

5. A method as recited in claim 1 further comprising:
   constructing said decision tree using a recursive partitioning algorithm.

6. A method as recited in claim 1 further comprising:
   calculating a hash value for each of said common substrings;
   storing said hash value in conjunction with its corresponding identified common substring at said each leaf node.

7. A method as recited in claim 6 wherein said hash value is derived using a locality-sensitive hash function.

8. A method as recited in claim 1 further comprising:
   saving said decision tree into a memory of said computer.

9. A method of identifying malware, said method comprising:
   receiving a suspect computer file at a computer server, said suspect file being unknown as to whether it is malware or not;
   walking a predetermined decision tree using said suspect file;
   reaching a leaf node of said decision tree and identifying a first hash value of a common substring of bytes and a byte offset within said suspect file at which it is possible that an approximation of said common substring begins, said first hash value being derived from a locality-sensitive hash function;
   identifying a suspect substring that begins at said byte offset within said suspect file and calculating a second hash value for said suspect substring, said second hash value being derived from said locality-sensitive hash function; and
   outputting a result to said computer server when it is determined that a distance between said first hash value and said second hash value is not greater than a threshold, said result indicating that it is likely that said suspect file is malware.

10. A method as recited in claim 9 wherein said leaf node further identifies a probability of said common substring occurring in a malware family, said method further comprising:
    outputting said result that indicates that said suspect file is likely a member of said malware family based upon said probability.

11. A method as recited in claim 9 further comprising:
    walking said decision tree using values at a plurality of byte offsets within said suspect file.

12. A method as recited in claim 9 wherein said computer server is a central location for malware scanning within an enterprise, said method further comprising:

receiving said suspect computer file from a client machine within said enterprise that has failed to identify said suspect file as being malware.

13. A method as recited in claim 9 wherein said leaf node further identifies a length of said common substring, said method further comprising:
   identifying said suspect substring using said byte offset and said length.

14. A method as recited in claim 9 wherein said walking includes:
   identifying a first node of said decision tree that includes a first byte offset into said suspect file; and
   choosing a path of said decision tree from said first node to a second node using a first value of said suspect file at said first byte offset.

15. A method as recited in claim 9 wherein said walking includes:
   identifying a first node of said decision tree that includes a first byte offset into said suspect file; and
   choosing a path of said decision tree from said first node to a second node using a first value of said suspect file at said first byte offset.

16. A method as recited in claim 9 wherein each node of said decision tree includes a test byte offset into said suspect file indicating a location of said data of said suspect file to be compared to a value of said each node.

17. A method as recited in claim 9 wherein said walking includes:
   comparing said data from said suspect file to values of nodes of said decision tree, said data being read from said suspect file in a non-linear order.

18. A method of identifying malware, said method comprising:
   retrieving, at an enterprise server, a suspect computer file from a client machine within an enterprise, it being unknown as to whether said suspect file is malware or not;
   walking a decision tree using said suspect file;
   identifying a leaf node of said decision tree and retrieving a first hash value of a common substring of bytes and a byte offset within said suspect file at which it is possible that said common substring begins;
   identifying a suspect substring that begins at said byte offset within said suspect file and calculating a second hash value for said suspect substring; and
   comparing said first hash value with said second hash value; and
   outputting a result to said enterprise server when it is determined that said comparing indicates that it is likely that said suspect file is malware.

19. A method as recited in claim 18 further comprising:
   receiving, at said enterprise server, a plurality of indications from a plurality of client machines within said enterprise that said suspect computer file is suspected of being malware; and
   performing said step of retrieving what it is determined that said plurality of indications is greater than a threshold.

20. A method as recited in claim 18 wherein said leaf node further identifies a probability of said common substring occurring in a malware family, said method further comprising:
   sending an indication that said suspect file is likely a member of said malware family from said enterprise to an antivirus service provider.

21. A method as recited in claim 18 further comprising:
   performing said step of comparing by using an exact matching algorithm or by using an approximate matching hash algorithm.

22. A method as recited in claim 18 further comprising:
   walking said decision tree using values found a plurality of byte offsets within said suspect file.

23. A method as recited in claim 18 wherein said enterprise server is a central location for malware scanning within an enterprise, said method further comprising:
   receiving said suspect computer file from said client machine within said enterprise that has failed to identify said suspect file as being malware.

24. A method as recited in claim 18 wherein said leaf node further identifies a length of said common substring, said method further comprising:
   identifying said suspect substring using said byte offset and said length.

25. A method as recited in claim 18 wherein said first and second hash values are derived using a locality-sensitive hash function, said method further comprising:
   determining that said suspect file is likely malware when a distance between said first hash value and said second hash value is not greater than a threshold.

26. A method of identifying malware, said method comprising:
   retrieving, at an enterprise server, a suspect computer file from a client machine within an enterprise, it being unknown as to whether said suspect file is malware or not;
   walking a decision tree using data from said suspect file;
   identifying a leaf node of said decision tree and retrieving from said leaf node a representation of a common substring of bytes and a byte offset within said suspect file at which it is probable that said common substring begins;
   identifying a suspect substring that begins at said byte offset within said suspect file;
   comparing said representation of said common substring with a representation of said suspect substring; and
   outputting a result to said enterprise server when it is determined that said comparing indicates that it is likely that said suspect file is malware.

27. A method as recited in claim 26 wherein said representation of said common substring is a hash value derived from a hash function, a hash value derived from a locality-sensitive hash function, is a CRC value of said common substring, or is a portion of said common substring.

28. A method as recited in claim 26 wherein said walking includes:
   identifying a first node of said decision tree that includes a first byte offset into said suspect file; and
   choosing a path of said decision tree from said first node to a second node using a first value of said suspect file at said first byte offset.

29. A method as recited in claim 26 wherein each node of said decision tree includes a byte offset into said suspect file indicating a location of said data of said suspect file to be compared to a value of said each node.

30. A method as recited in claim 26 wherein said walking includes:
   comparing said data from said suspect file to values of nodes of said decision tree, said data being read from said suspect file in a non-linear order.

31. A method as recited in claim 26 wherein said comparing includes:

comparing a hash value of said common substring with a hash value of said suspect substring; and performing approximate string matching of said common substring with said suspect substring when said hash values do not match.

32. A method as recited in claim 26 wherein said comparing includes:

comparing the first N bytes of said common substring with the first N bytes of said suspect substring; and comparing a hash value of said common substring with a hash value of said suspect substring when said first N bytes do not match.

* * * * *